(12) United States Patent
Effler, Jr. et al.

(10) Patent No.: US 9,284,440 B2
(45) Date of Patent: Mar. 15, 2016

(54) POLYETHYLENE BLEND COMPOSITION SUITABLE FOR BLOWN FILM, METHOD OF PRODUCING THE SAME, AND FILMS MADE THEREFROM

(75) Inventors: Lawrence J. Effler, Jr., Rosharon, TX (US); Nilesh R. Savargaonkar, Pearland, TX (US); Mehmet Demirors, Pearland, TX (US); Selim Bensason, Rueschlikon (CH); Teresa P. Karjala, Lake Jackson, TX (US); Gregory Bunker, Midland, MI (US); Cristina Serrat, Sugar Land, TX (US); Jian Wang, Rosharon, TX (US)

(73) Assignee: Dow Global Technologies LLC, Midland, MI (US)

( * ) Notice: Subject to any disclaimer, the term of this patent is extended or adjusted under 35 U.S.C. 154(b) by 122 days.

(21) Appl. No.: 14/118,646

(22) PCT Filed: Jul. 2, 2012

(86) PCT No.: PCT/US2012/045218
§ 371 (c)(1),
(2), (4) Date: Nov. 19, 2013

(87) PCT Pub. No.: WO2013/009511
PCT Pub. Date: Jan. 17, 2013

(65) Prior Publication Data
US 2014/0113090 A1 Apr. 24, 2014

Related U.S. Application Data

(60) Provisional application No. 61/505,869, filed on Jul. 8, 2011.

(51) Int. Cl.
*C08L 23/06* (2006.01)
*C08J 5/18* (2006.01)
*C08L 23/08* (2006.01)
*B32B 1/02* (2006.01)

(52) U.S. Cl.
CPC . *C08L 23/06* (2013.01); *B32B 1/02* (2013.01); *C08J 5/18* (2013.01); *C08L 23/0815* (2013.01); *C08J 2323/08* (2013.01); *Y10T 428/1352* (2015.01)

(58) Field of Classification Search
CPC ........ C08L 23/06; C08L 23/0815; C08J 5/18; C08J 2323/08; Y10T 428/1352; B32B 1/02
See application file for complete search history.

(56) References Cited

U.S. PATENT DOCUMENTS

| | | | |
|---|---|---|---|
| 5,455,303 A | 10/1995 | Panagopoulos, Jr. et al. | |
| 6,130,293 A † | 10/2000 | Hitchcock | |
| 6,545,094 B2 † | 4/2003 | Oswald | |
| 2006/0046048 A1 | 3/2006 | Kapur et al. | |
| 2006/0047077 A1 | 3/2006 | Tas | |
| 2009/0192270 A1 | 7/2009 | Malakoff et al. | |
| 2010/0233293 A1 | 9/2010 | Bose | |
| 2010/0266797 A1 † | 10/2010 | Pradella | |
| 2010/0317804 A1 | 12/2010 | Karjala et al. | |
| 2011/0160403 A1 | 6/2011 | Mavridis | |
| 2012/0202942 A1 | 8/2012 | Mavridis | |

FOREIGN PATENT DOCUMENTS

| WO | 99/55775 | | 11/1999 |
|---|---|---|---|
| WO | 2006/096566 A1 † | 9/2006 |
| WO | 2010/144784 A1 † | 12/2010 |

OTHER PUBLICATIONS

PCT/US2012/045218_International_Preliminary_Report_on_Patentabilit_Mailed_Jan. 23, 2014.
TAS_Processability_and_Film_Performance_of_Single_Site_sLLDPE/ LDPE_Blends_Soc_PlasticEngineers_ANTEC_Proceedings_63rd_138-142_2005.
TAS_et.al_Bubble_Stability_and_Maximum_Output_of SURPASS™_sLLDPE_Resins_in_Blow_Films_TAPPI_PLACE_Conf_320-330_2004.
Cooke_et.al_Addition_Of_Branched_Molecules_and_High_Molecular_Weight_Molecules_to_improve_Optical_Properties_of_LLDPE Film_JOURNAL_OF_PLASTIC_FILM and SHEETING_vol_5_4_1_1989_pp. 290-307.
Williams_and_Ward_J_Polym_Sci_Polym_Letters_6_621_1968.
PCT/US2012/045218_International_Search_Report_and_Written_Opinion_of_the_International_Searching_Authority.
Jordens, "The Influence of Small Amounts of LDPE on the Morphology and Resulting Haze of LLDPE Blown films", ANTEC 2002, pp. 1-7.†
Kyowa Chemical, "Halogen Scavenger, DHT-4A" (Dec. 1998) pp. 1-6.†
Veazey, "High Performance LLDPE Blown film Equipment", J. Plastic Film and Sheeting, vol. 1 (Jan. 1985), pp. 60-67.†
Usami, "Fine-Branching Structure in High-Pressure, Low-Density Polyethylene by 50.10-MHz 13C NMR Analysis", Macromolecules, vol. 17 (Oct. 1, 1984) pp. 1756-1761.†

† cited by third party

*Primary Examiner* — Michael C Miggins

(57) ABSTRACT

The instant invention provides a polyethylene blend composition suitable for blown film, method of producing the same, and films made therefrom. The polyethylene blend composition suitable for blown film according to the present invention comprises the melt blending product of: (a) less than or equal to 4 percent by weight of a low density polyethylene (LDPE) having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (b) 90 percent or greater by weight of a heterogenous linear low density polyethylene (hLLDPE) having a density in the range of from 0.917 to 0.950 g/cm$^3$, and a melt index ($I_2$) in the range of from 0.1 to less than or equal to 5 g/10 minutes; (c) optionally a hydrotalcite based neutralizing agent; (d) optionally one or more nucleating agents; and (e) optionally one or more antioxidants. When the polyethylene blend-composition is formed into a film via blown film process, the output rate is improved at least 6 percent relative to a similar linear low density polyethylene.

8 Claims, 1 Drawing Sheet

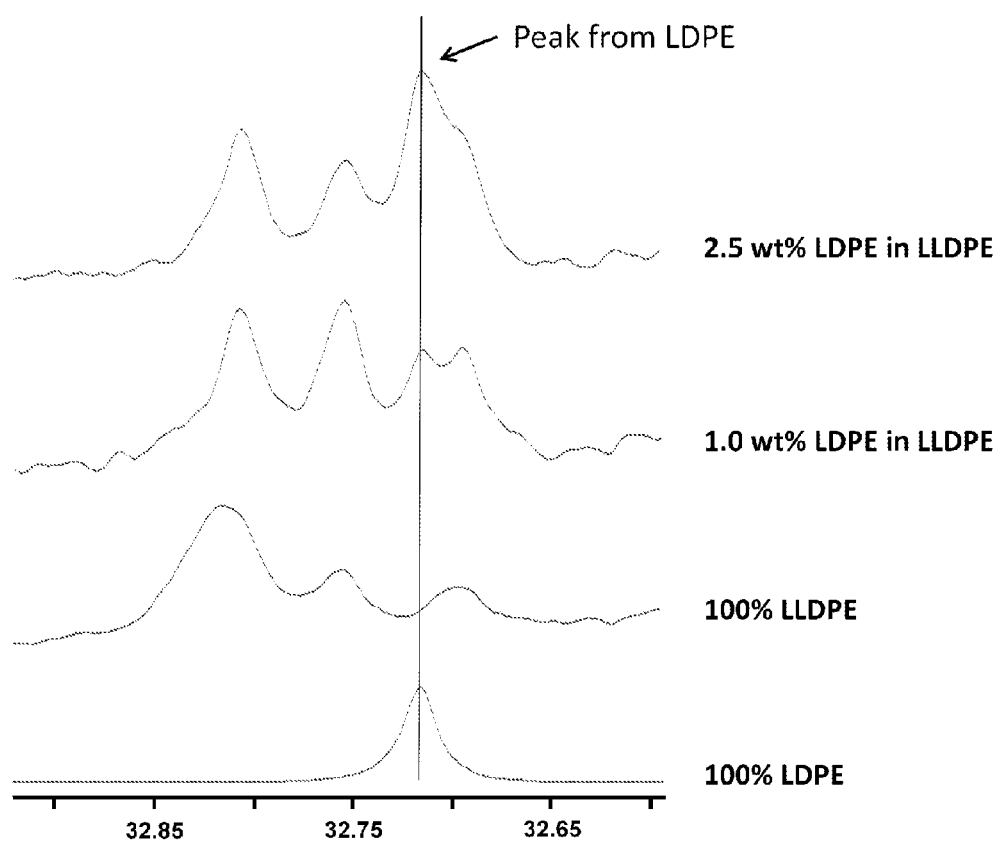

POLYETHYLENE BLEND COMPOSITION SUITABLE FOR BLOWN FILM, METHOD OF PRODUCING THE SAME, AND FILMS MADE THEREFROM

CROSS-REFERENCE TO RELATED APPLICATIONS

This application is a non-provisional application claiming priority from the U.S. Provisional Patent Application No. 61/505,869, filed on Jul. 8, 2011, entitled "POLYETHYLENE BLEND COMPOSITION SUITABLE FOR BLOWN FILM, METHOD OF PRODUCING THE SAME, AND FILMS MADE THEREFROM," the teachings of which are incorporated by reference herein, as if reproduced in full hereinbelow.

FIELD OF INVENTION

The instant invention relates to a polyethylene blend composition suitable for blown film, method of producing the same, and films made therefrom.

BACKGROUND OF THE INVENTION

The use of polymeric materials such as ethylene-based compositions in an extrusion blown film process is well-known. The extrusion blown film process employs an extruder which heats, melts, and conveys the molten polymeric material and forces it through an annular die. The ethylene-based film is drawn from the die and formed into a tubular shape and eventually passed through a pair of draw or nip rollers. Internal compressed air is then introduced from the mandrel causing the tube to increase in diameter forming a bubble of the desired size. Thus, the blown film is stretched in two directions, namely in the axial direction, i.e. by the use of forced air which expands the diameter of the bubble, and in the lengthwise direction of the bubble, i.e. by the action of a winding element which pulls the bubble through the machinery. External air is also introduced around the bubble circumference to cool the melt as it exits the die. The film width is varied by introducing more or less internal air into the bubble thus increasing or decreasing the bubble size. The film thickness is controlled primarily by increasing or decreasing the speed of the draw roll or nip roll to control the draw-down rate.

The bubble is then collapsed into two doubled layers of film immediately after passing through the draw or nip roll. The cooled film can then be processed further by cutting or sealing to produce a variety of consumer products.

Despite the research efforts in producing the polymeric materials suitable for blown films, there is still a need for a polyethylene blend composition suitable for blown film, providing improved output rates. Furthermore, there is still a need for a method of producing a polyethylene blend composition suitable for blown film, providing improved output rates.

SUMMARY OF THE INVENTION

The instant invention provides a polyethylene blend composition suitable for blown film, method of producing the same, and films made therefrom.

In one embodiment, the instant invention provides a polyethylene blend composition suitable for blown film comprising the melt blending product of: (a) less than or equal to 4 percent by weight of a low density polyethylene (LDPE) having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (b) 90 percent or greater by weight of a heterogeneous linear low density polyethylene (hLLDPE) having a density in the range of from 0.917 to 0.950 g/cm$^3$, and a melt index ($I_2$) in the range of from 0.1 to less than or equal to 5 g/10 minutes; (c) optionally a hydrotalcite based neutralizing agent; (d) optionally one or more nucleating agents; and (e) optionally one or more antioxidants. When said polyethylene blend-composition is formed into a film via a blown film process, the output rate is improved at least 6 percent relative to a similar linear low density polyethylene.

In an alternative embodiment, the instant invention further provides a blown film comprising a polyethylene blend composition comprising the melt blending product of: (a) less than or equal to 4 percent by weight of a low density polyethylene (LDPE) having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (b) 90 percent or greater by weight of a heterogeneous linear low density polyethylene (hLLDPE) having a density in the range of from 0.917 to 0.950 g/cm$^3$, and a melt index ($I_2$) in the range of from 0.1 to less than or equal to 5 g/10 minutes; (c) optionally a hydrotalcite based neutralizing agent; (d) optionally one or more nucleating agents; and (e) optionally one or more antioxidants.

In another alternative embodiment, the instant invention further provides an article comprising one or more blown films comprising a polyethylene blend composition suitable for blown film comprising the melt blending product of: (a) less than or equal to 4 percent by weight of a low density polyethylene (LDPE) having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (b) 90 percent or greater by weight of a heterogeneous linear low density polyethylene (hLLDPE) having a density in the range of from 0.917 to 0.950 g/cm$^3$, and a melt index ($I_2$) in the range of from 0.1 to less than or equal to 5 g/10 minutes; (c) optionally a hydrotalcite based neutralizing agent; (d) optionally one or more nucleating agents; and (e) optionally one or more antioxidants.

In another alternative embodiment, the instant invention further provides a container device comprising: one or more substrates; and one or more layers comprising one or more blown films comprising a polyethylene blend composition suitable for blown film comprising the melt blending product of: (a) less than or equal to 4 percent by weight of a low density polyethylene (LDPE) having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (b) 90 percent or greater by weight of a heterogeneous linear low density polyethylene (hLLDPE) having a density in the range of from 0.917 to 0.950 g/cm$^3$, and a melt index ($I_2$) in the range of from 0.1 to less than or equal to 5 g/10 minutes; (c) optionally a hydrotalcite based neutralizing agent; (d) optionally one or more nucleating agents; and (e) optionally one or more antioxidants.

In an alternative embodiment, the instant invention provides a polyethylene blend composition suitable for blown film, blown films and articles made therefrom, in accordance with any of the preceding embodiments, except that the polyethylene blend composition comprises less than or equal to 3.5 percent by weight of a low density polyethylene; for example from 1 to 3.5 weight percent; or in the alternative, from 1.5 to 3 weight percent.

In an alternative embodiment, the instant invention provides a polyethylene blend composition suitable for blown film, blown films and articles made therefrom, in accordance with any of the preceding embodiments, except that the low density polyethylene has a density in the range of from 0.916 to 0.930 g/cm$^3$; or in the alternative, from 0.917 to 0.925 g/cm$^3$; or in the alternative, from 0.917 to 0.922 g/cm$^3$.

In an alternative embodiment, the instant invention provides a polyethylene blend composition suitable for blown film, blown films and articles made therefrom, in accordance with any of the preceding embodiments, except that the low density polyethylene has a melt index ($I_2$) in the range of from 1 to 4 g/10 minutes; or in the alternative, from 1.2 to 3.5 g/10 minutes; or in the alternative, from 1.5 to 3 g/10 minutes; or in the alternative, from 1.6 to 2.7 g/10 minutes.

In an alternative embodiment, the instant invention provides a polyethylene blend composition suitable for blown film, blown films and articles made therefrom, in accordance with any of the preceding embodiments, except that the low density polyethylene has a molecular weight distribution ($M_w/M_n$) in the range of from 6 to 9.5; or in the alternative, from 6 to 9; or in the alternative, from 6 to 8.5; or in the alternative, from 7.5 to 9.

In an alternative embodiment, the instant invention provides a polyethylene blend composition suitable for blown film, blown films and articles made therefrom, in accordance with any of the preceding embodiments, except that the polyethylene blend composition suitable for blown film comprises 92 percent or greater by weight of the heterogeneous linear low density polyethylene; or in the alternative, 94 percent or greater by weight of the heterogeneous linear low density polyethylene; or in the alternative, 95 percent or greater by weight of the heterogeneous linear low density polyethylene; or in the alternative, 96 percent or greater by weight of the heterogeneous linear low density polyethylene.

In an alternative embodiment, the instant invention provides a polyethylene blend composition suitable for blown film, blown films and articles made therefrom, in accordance with any of the preceding embodiments, except that the heterogeneous linear low density polyethylene has a density in the range of from 0.917 to 0.930 g/cm$^3$; or in the alternative, from 0.917 to 0.925 g/cm$^3$; or in the alternative, from 0.918 to 0.922 g/cm$^3$; or in the alternative, from 0.919 to 0.921 g/cm$^3$.

In an alternative embodiment, the instant invention provides a polyethylene blend composition suitable for blown film, blown films and articles made therefrom, in accordance with any of the preceding embodiments, except that the heterogeneous linear low density polyethylene has a melt index ($I_2$) in the range of from 0.5 to 3 g/10 minutes; for example, from 0.5 to 2 g/10 minutes; or in the alternative, from 0.5 to 1.5 g/10 minutes; or in the alternative, from 0.8 to 2 g/10 minutes; or in the alternative, from 0.8 to 1.5 g/10 minutes; or in the alternative, from 0.8 to 1.2 g/10 minutes; or in the alternative, from 0.95 to 1.05 g/10 minutes.

In an alternative embodiment, the instant invention provides a polyethylene blend composition suitable for blown film, blown films and articles made therefrom, in accordance with any of the preceding embodiments, except that the polyethylene blend composition has a peak at 32.7 ppm measured via $^{13}$C NMR.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 1 reports the $^{13}$C NMR results for a low density polyethylene, heterogeneous linear low density polyethylene, and an inventive polyethylene blend composition.

DETAILED DESCRIPTION OF THE INVENTION

The instant invention provides a polyethylene blend composition suitable for blown film, method of producing the same, and films made therefrom. The term "polyethylene blend composition," as used herein, refers to a physical blend of at least a low density polyethylene and a heterogeneous linear low density polyethylene, as described herein.

The instant invention provides a polyethylene blend composition suitable for blown film comprising the melt blending product of: (a) less than or equal to 4 percent by weight of a low density polyethylene having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (b) 90 percent or greater by weight of a heterogeneous linear low density polyethylene having a density in the range of from 0.917 to 0.950 g/cm$^3$, and a melt index ($I_2$) in the range of from 0.1 to less than or equal to 5 g/10 minutes; (c) optionally a hydrotalcite based neutralizing agent; (d) optionally one or more nucleating agents; and (e) optionally one or more antioxidants. When said polyethylene blend composition is formed into a film via blown film process, the output rate increases at least 6 percent relative to blown film produced from a similar linear low density polyethylene.

The polyethylene blend composition has a density in the range of 0.917 to 0.950 g/cm$^3$. All individual values and subranges from 0.917 to 0.950 g/cm$^3$ are included herein and disclosed herein; for example, the density can be from a lower limit of 0.917 or 0.919 g/cm$^3$ to an upper limit of 0.930, 0.940, 0.945, or 0.950 g/cm$^3$. For example, the polyethylene blend composition may have a density in the range of from 0.917 to 0.925 g/cm$^3$; or in the alternative, from 0.918 to 0.922 g/cm$^3$; or in the alternative, from 0.919 to 0.921 g/cm$^3$.

The polyethylene blend composition has a melt index ($I_2$) in the range of from 0.1 to 5 g/10 minutes. All individual values and subranges from 0.1 to 5 g/10 minutes are included herein and disclosed herein; for example, the melt index ($I_2$) can be from a lower limit of 0.1, 0.2, 0.5, or 0.8 g/10 minutes, to an upper limit of 1, 2, 3, 4, or 5 g/10 minutes. For example, the polyethylene blend composition may have a melt index ($I_2$) in the range of from 0.2 to 5 g/10 minutes; or in the alternative, from 0.2 to 3 g/10 minutes; or in the alternative, from 0.5 to 2 g/10 minutes.

The polyethylene blend composition has a Strain Hardening Factor (SHF) value of equal or greater than 1.4 at 1.0 Hencky Strain Rate at 150° C.; for example, a Strain Hardening Factor (SHF) value of equal or greater than 1.5 at 1.0 Hencky Strain Rate at 150° C.; or in the alternative, a Strain Hardening Factor (SHF) value of equal or greater than 1.6 at 1.0 Hencky Strain Rate at 150° C.; for example, a Strain Hardening Factor (SHF) value in the range of from 1.4 to 3.0 at 1.0 Hencky Strain Rate at 150° C.

The enhanced SHF value for the inventive polyethylene blend compositions are due to the strain hardening effect from the LDPE component in the polyethylene blend composition; thus, providing significantly stronger strain hardening to the polyethylene blend compositions of the present invention, leading to a higher melt strength, better bubble stability and higher output rate.

In one embodiment, the polyethylene blend composition has a peak at 32.7 ppm measured via $^{13}C$ NMR indicating the presence of the $C_3$ carbon of a $C_5$ or amyl branch in the LDPE component.

In another embodiment, when the polyethylene blend composition is formed into a film via a blown film process, the total haze is improved by at least 15 percent relative to a blown film consisting essentially of a linear low density polyethylene.

In another embodiment, when the polyethylene blend composition is formed into a film via a blown film process, the gloss is improved by at least 10 percent relative to a blown film consisting essentially of a linear low density polyethylene.

Low Density Polyethylene (LDPE) Component

The polyethylene blend composition suitable for blown film according to the present invention comprises less than or equal to 4 percent by weight of a low density polyethylene (LDPE); for example, from 0.5 to 4 weight percent; or in the alternative, from 0.5 to 3 weight percent; or in the alternative, from 1 to 3.5 weight percent. The low density polyethylene has a density in the range of from 0.915 to 0.935 g/cm$^3$; for example, from 0.915 to 0.925 g/cm$^3$; or in the alternative, from 0.918 to 0.922 g/cm$^3$. The low density polyethylene has a melt index ($I_2$) in the range of from greater than 0.8 to less than or equal to 5 g/10 minutes; for example, from 1 to 3 g/10 minutes; or in the alternative, from 1.5 to 2.5 g/10 minutes. The low density polyethylene has a molecular weight distribution ($M_w/M_n$) in the range of from 6 to 10; for example, from 6 to 9.5; or in the alternative, from 6 to 9; or in the alternative, from 6 to 8.5; or in the alternative, from 7.5 to 9. Such low density polyethylene compositions are commercially available, for example, from The Dow Chemical Company.

Heterogeneous Linear Low Density Polyethylene (hLLDPE) Component

The polyethylene blend composition suitable for blown film according to the present invention comprises 90 percent or greater by weight of a heterogeneous linear low density polyethylene (hLLDPE); for example, from 90 to 99 weight percent; or in the alternative from 95 to 99 weight percent; or in the alternative from 97 to 99 weight percent. The term heterogeneous linear low density polyethylene (hLLDPE), as used herein, refers to a linear low density polyethylene that is prepared via a heterogeneous catalyst system including 2 or more active sites for polymerization.

The hLLDPE has a density in the range of from 0.917 to 0.950 g/cm$^3$. All individual values and subranges from 0.917 to 0.950 g/cm$^3$ are included herein and disclosed herein; for example, the density can be from a lower limit of 0.0917, 0.918, or 0.919 g/cm$^3$ to an upper limit of 0.930, 0.941, 0.947, or 0.950 g/cm$^3$. For example, the hLLDPE may have a density in the range of from 0.917 to 0.950 g/cm$^3$; or in the alternative, from 0.917 to 0.925 g/cm$^3$; or in the alternative, from 0.918 to 0.925 g/cm$^3$; or in the alternative, from 0.918 to 0.922 g/cm$^3$; or in the alternative, from 0.919 to 0.921 g/cm$^3$.

The hLLDPE has a molecular weight distribution ($M_w/M_n$) in the range of from 3.5 to 5.

The hLLDPE has a melt index ($I_2$) in the range of from 0.1 to 5 g/10 minutes. All individual values and subranges from 0.1 to 5 g/10 minutes are included herein and disclosed herein; for example, the melt index ($I_2$) can be from a lower limit of 0.1, 0.2, 0.5, or 0.8 g/10 minutes, to an upper limit of 1, 2, 3, 4, or 5 g/10 minutes. For example, the hLLDPE may have a melt index ($I_2$) in the range of from 0.2 to 5 g/10 minutes; or in the alternative, from 0.2 to 3 g/10 minutes; or in the alternative, from 0.5 to 2 g/10 minutes.

The hLLDPE may have a melt flow ratio ($I_{10}/I_2$) in the range of from 6 to 10. All individual values and subranges from 6 to 10 are included herein and disclosed herein. For example, the hLLDPE may have a melt flow ratio ($I_{10}/I_2$) in the range of from 7 to 10; or in the alternative, from 7 to 9.

The hLLDPE may have 2 or more peaks on the DSC heating curve, measured according to the Differential Scanning calorimetry (DSC) method.

The hLLDPE may comprise less than 35 percent by weight of units derived from one or more α-olefin comonomers. All individual values and subranges from less than 35 weight percent are included herein and disclosed herein; for example, the hLLDPE may comprise less than 25 percent by weight of units derived from one or more α-olefin comonomers; or in the alternative, less than 20 percent by weight of units derived from one or more α-olefin comonomers; or in the alternative, less than 15 percent by weight of units derived from one or more α-olefin comonomers; or in the alternative, less than 10 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The hLLDPE may comprise at least 65 percent by weight of units derived from ethylene. All individual values and subranges from at least 65 weight percent are included herein and disclosed herein; for example, the hLLDPE may comprise at least 75 percent by weight of units derived from ethylene; or in the alternative, at least 85 percent by weight of units derived from ethylene; or in the alternative, at least 90 percent by weight of units derived from ethylene.

The hLLDPE may further be compounded with one or more additional components such as other polymers and/or additives. Such additives include, but are not limited to, antistatic agents, color enhancers, dyes, lubricants, fillers, pigments, primary antioxidants, secondary antioxidants, processing aids, UV stabilizers, nucleating agents, and/or combinations thereof. The hLLDPE may contain any amounts of additives. The hLLDPE may comprise from about 0 to about 10 percent by the combined weight of such additives, based on the combined weight of hLLDPE and such additives.

Any conventional ethylene (co)polymerization reaction may be employed to produce the hLLDPE. Such conventional ethylene (co)polymerization reactions include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof.

Such hLLDPE are commercially available under the tradename DOWLEX™ from The Dow Chemical Company.

Additives

The polyethylene blend composition may further comprise one or more additional additives. Such additives include, but are not limited to, one or more hydrotalcite based neutralizing agents, one or more nucleating agents, one or more antistatic agents, one or more color enhancers, one or more dyes, one or more lubricants, one or more fillers, one or more pigments, one or more primary antioxidants, one or more secondary antioxidants, one or more processing aids, one or more UV stabilizers, and/or combinations thereof. The polyethylene blend composition may comprise any amounts of such additives. The polyethylene blend composition may comprise from about 0 to about 10 percent by the combined weight of such additives, based on the total weight of the polyethylene blend composition.

Production

The polyethylene blend composition is prepared via any conventional melt blending process such as extrusion via an extruder, e.g. single or twin screw extruder. The LDPE, hLLDPE, and optionally one or more additives may be melt blended in any order via one or more extruders to form a uniform polyethylene blend composition.

Applications

The polyethylene blend composition may be formed into a film via, for example, a blown film process. In one embodiment, when the polyethylene blend composition is formed into a film via a blown film process, the output rate is improved at least 6 percent relative to a similar linear low density polyethylene; or in the alternative, the total haze is improved by at least 15 percent relative to a blown film consisting essentially of a linear low density polyethylene; or in the alternative, the gloss is improved by at least 10 percent relative to a blown film consisting essentially of a linear low density polyethylene. In one embodiment, the polyethylene blend composition may be formed into a multi-layer blown film structure. In another embodiment, the polyethylene blend composition may be formed into a single layer or a multi-layer blown film structure associated with one or more substrates. The blown films prepared according to the present invention may be used as lamination films where the blown polyethylene film is adhesively laminated to a substrate such as biaxially oriented polypropylene (BOPP) films or biaxially oriented polyethylene terephthalate (BOPET) films, liner films, sealant webs, shrink films, stretch films, etc. The blown films according to the present invention have a thickness in the range of from 0.8 to 5 mils.

EXAMPLES

The following examples illustrate the present invention but are not intended to limit the scope of the invention. The examples of the instant invention demonstrate that when the polyethylene blend composition is formed into a film via a blown film process, the output rate is improved at least 6 percent relative to a similar linear low density polyethylene; or in the alternative, the total haze is improved by at least 15 percent relative to a blown film consisting essentially of a linear low density polyethylene; or in the alternative, the gloss is improved by at least 10 percent relative to a blown film consisting essentially of a linear low density polyethylene.

Inventive Composition 1

Inventive Composition 1 is a polyethylene blend composition comprising the melt blending product of (a) 3 percent by weight of a low density polyethylene (LDPE) component having a melt index ($I_2$) of approximately 1.85 g/10 minutes, and a density of 0.919 g/cm$^3$, as further defined in Table 1, provided by The Dow Chemical Company; and (b) 97 percent by weight of a heterogeneous linear low density polyethylene 1 (hLLDPE 1) component, which is a linear low density polyethylene (LLDPE) prepared via a Ziegler-Natta catalyst in a single solution phase reactor, having a Melt index ($I_2$) of approximately 1.0 g/10 minutes and a density of approximately 0.92 g/cm$^3$, and further described in Table 1, commercially available under the tradename DOWLEX™ 2045G from The Dow Chemical Company. The properties of the Inventive Composition 1 are measured, and reported in Table 2.

Inventive Composition 2

Inventive Composition 2 is a polyethylene blend composition comprising the melt blending product of (a) 3 percent by weight of a low density polyethylene (LDPE) having a melt index ($I_2$) of approximately 1.85 g/10 minutes, and a density of 0.919 g/cm$^3$, as further defined in Table 1, provided by The Dow Chemical Company; (b) 97 percent by weight of a heterogeneous linear low density polyethylene 2 (hLLDPE 2) component (including 750 parts of DHT-4A per million parts of the hLLDPE 2), which is a linear low density polyethylene (LLDPE) prepared via a Ziegler-Natta catalyst in a single solution phase reactor, having a melt index ($I_2$) of approximately 1.0 g/10 minutes and a density of approximately 0.92 g/cm$^3$, and further described in Table 1, provided by The Dow Chemical Company. The properties of the Inventive Composition 2 are measured, and reported in Table 2.

Comparative Composition A

Comparative Composition A is a heterogeneous linear low density polyethylene, which is a linear low density polyethylene (LLDPE) prepared via a Ziegler-Natta catalyst in a single solution phase reactor, having a Melt index ($I_2$) of approximately 1.0 g/10 minutes and a density of approximately 0.92 g/cm$^3$, commercially available under the tradename DOWLEX™ 2045G from The Dow Chemical Company. The properties of the Comparative Composition 1 are measured, and reported in Table 2.

Comparative Composition B

Comparative Composition B is a heterogeneous linear low density polyethylene (including 750 parts of DHT-4A per million parts of the hLLDPE), which is a linear low density polyethylene (LLDPE) prepared via a Ziegler-Natta catalyst in a single solution phase reactor, having a melt index ($I_2$) of approximately 1.0 g/10 minutes and a density of approximately 0.92 g/cm$^3$, provided by The Dow Chemical Company. The properties of the Comparative Composition 2 are measured, and reported in Table 2.

Inventive Films 1 and 2

Inventive Compositions 1 and 2 are formed into Inventive Films 1 and 2, respectively, via a blown film process based on the process conditions reported in Table 3. Inventive Films 1 and 2, monolayer films, were tested for their properties, and the results are reported in Table 4. Note that the film properties reported in Table 4 are for films made at standard rates of 10 lb/hr/in or 250 lb/hr.

Comparative Films A and B

Comparative Compositions A and B are formed into Comparative Films A and B, respectively, via a blown film process based on the process conditions reported in Table 3. Comparative Films A and B, monolayer films, are tested for their properties, and the results are reported in Table 4. Note that the film properties reported in Table 4 are for films made at standard rates of 10 lb/hr/in or 250 lb/hr.

TABLE 1

|  | Units | LDPE Component | hLLDPE 1 Component | hLLDPE 2 Component |
| --- | --- | --- | --- | --- |
| Density | g/cm$^3$ | 0.919 | 0.920 | 0.921 |
| $I_2$ | g/10 min | 1.85 | 0.97 | 1.01 |
| $I_{10}/I_2$ |  | 14.3 | 7.8 | 7.4 |
| Viscosity (0.1 rad/s) | Pa · s | 8,863 | 8,757 | 8,089 |
| Viscosity (1.0 rad/s) | Pa · s | 4,639 | 6,939 | 6,595 |

TABLE 1-continued

| | Units | LDPE Component | hLLDPE 1 Component | hLLDPE 2 Component |
|---|---|---|---|---|
| Viscosity (10 rad/s) | Pa·s | 1,658 | 4,085 | 4,008 |
| Viscosity (100 rad/s) | Pa·s | 464 | 1,606 | 1,618 |
| Tan Delta (0.1 rad/s) | | 3.1 | 9.3 | 10.8 |
| SHF (1.0 s$^{-1}$ strain rate, 150° C.) | | 4.9 | 1.37 | 1.36 |
| Melt Strength | cN | 9.2 | 2.9 | 3.0 |
| $M_n$ | g/mol | 11,628 | 24,870 | 26,070 |
| $M_w$ | g/mol | 94,485 | 113,220 | 110,980 |
| $M_z$ | g/mol | 321,061 | 374,000 | 335,200 |
| $M_w/M_n$ | | 8.13 | 4.55 | 4.26 |
| $T_{m1}$ (DSC) | ° C. | 109.2 | 120.1 | 120.2 |
| $T_{m2}$ (DSC) | ° C. | | 109.6 | 110.8 |
| $T_c$ (DSC) | ° C. | 95.7 | 108.1 | 107.8 |
| Heat of fusion | J/g | 136.8 | 147.6 | 150.8 |

GPC properties are based on the conventional calibration of the High Temperature GPC.

TABLE 2

| Polymer Property | Units | Inventive Composition 1 | Inventive Composition 2 | Comparative Composition A | Comparative Composition B |
|---|---|---|---|---|---|
| Density | g/cm$^3$ | 0.920 | 0.921 | 0.920 | 0.921 |
| $I_2$ | g/10 min | 0.99 | 0.97 | 0.97 | 1.01 |
| $I_{10}/I_2$ | | 8.0 | 7.6 | 7.8 | 7.4 |
| Viscosity (0.1 rad/s) | Pa·s | 8,643 | 8,499 | 8,757 | 8,089 |
| Viscosity (1.0 rad/s) | Pa·s | 6,788 | 6,760 | 6,939 | 6,595 |
| Viscosity (10 rad/s) | Pa·s | 3,982 | 4,002 | 4,085 | 4,008 |
| Viscosity (100 rad/s) | Pa·s | 1,568 | 1,590 | 1,606 | 1,618 |
| Tan Delta (0.1 rad/s) | | 8.8 | 9.8 | 9.3 | 10.8 |
| SHF (1.0 s$^{-1}$ strain rate, 150° C.) | | 1.69 | 1.67 | 1.37 | 1.36 |
| Melt Strength | cN | 4.2 | 4.0 | 2.9 | 3.0 |
| $M_n$ | g/mol | 24,710 | 24,720 | 24,870 | 26,070 |
| $M_w$ | g/mol | 112,110 | 112,800 | 113,220 | 110,980 |
| $M_z$ | g/mol | 355,400 | 352,200 | 374,000 | 335,200 |
| $M_w/M_n$ | | 4.54 | 4.56 | 4.55 | 4.26 |
| $T_{m1}$ (DSC) | ° C. | 120.8 | 121.2 | 120.1 | 120.2 |
| $T_{m2}$ (DSC) | ° C. | 110.5 | 111.6 | 109.6 | 110.8 |
| $T_c$ (DSC) | ° C. | 109.2 | 109.5 | 108.1 | 107.8 |
| Heat of fusion | J/g | 144 | 146.5 | 147.6 | 150.8 |

GPC properties are based on the conventional calibration of the High Temperature GPC.

TABLE 3

| Film Fabrication | Units | Inventive Film 1 | Inventive Film 2 | Comparative Film A | Comparative Film B |
|---|---|---|---|---|---|
| Max Output rate | lbs/hr | 377 | 402 | 344 | 363 |
| Max Output rate | lbs/hr/inch | 15.1 | 16.1 | 13.8 | 14.5 |
| Rate improvement over Comparative Composition A | % | 9.6 | 16.9 | 0 | 5.5 |
| Screw Speed (RPM) | RPM | 54 | 51 | 48 | 45 |
| Frost Line Height (FLH-inch) | Inch | 54 | 59 | 43 | 63 |
| External Air (%) | % | 54.2 | 54.9 | 49.6 | 47.6 |
| IBC Exhaust Air (%) | % | 97.8 | 99.2 | 98.2 | 98.5 |
| IBC Supply Air | % | 48.5 | 48.5 | 49.5 | 50 |
| % Full load current | % | 5.7 | 6.2 | 5.4 | 6.5 |
| Horsepower | HP | 7 | 7 | 6 | 7 |
| Barrel P1 (psi) | psi | 2,900 | 4,340 | 3,000 | 4,220 |
| Barrel P2 (psi) | Psi | 3,770 | 5,320 | 3,720 | 5,170 |
| Barrel P3 (psi) | Psi | 4,010 | 5,000 | 3,940 | 4,670 |
| Screen Pressure (psi) | Psi | 4,120 | 4,840 | 3,940 | 4,420 |
| Adapter P (psi) | Psi | 1,360 | 1,410 | 910 | 1,000 |
| Melt Temp. | ° F. | 467 | 470 | 459 | 462 |
| Temp. Profile (° F.) | | | | | |
| Barrel T1 | ° F. | 375 | 375 | 375 | 375 |
| Barrel T2 | ° F. | 420 | 420 | 420 | 420 |
| Barrel T3 | ° F. | 390 | 390 | 390 | 390 |
| Barrel T4 | ° F. | 375 | 375 | 375 | 375 |
| Barrel T5 | ° F. | 375 | 375 | 375 | 375 |
| Screen T | ° F. | 450 | 450 | 450 | 450 |
| Adapter T | ° F. | 450 | 450 | 450 | 450 |
| Block T | ° F. | 450 | 450 | 450 | 450 |
| Lower Die T | ° F. | 450 | 450 | 450 | 450 |
| Inner Die T | ° F. | 450 | 450 | 450 | 450 |
| Upper Die T | ° F. | 450 | 450 | 450 | 450 |

TABLE 4

| Film Properties | Units | Inventive Film 1 | Inventive Film 2 | Comparative Film A | Comparative Film B |
|---|---|---|---|---|---|
| Film Thickness | mil | 2.0 | 2.0 | 2.0 | 2.0 |
| Dart Impact Resistance | g | 398 | 259 | 364 | 376 |

TABLE 4-continued

| Film Properties | Units | Inventive Film 1 | Inventive Film 2 | Comparative Film A | Comparative Film B |
|---|---|---|---|---|---|
| Tear: Elmendorf-MD | g/mil | 377 | 389 | 453 | 475 |
| Tear: Elmendorf-CD | g/mil | 674 | 621 | 662 | 617 |
| Puncture Strength | ft * 1 bf/in$^3$ | 275 | 243 | 318 | 302 |
| Total Haze | % | 12.3 | 13.8 | 17.9 | 18.1 |
| Internal Haze | % | 3.9 | 4.0 | 4.7 | 4.3 |
| Gloss | % | 54.3 | 49.0 | 42.4 | 40.9 |
| Secant Modulus-CD (1%) | psi | 38,769 | 41,830 | 40,161 | 42,020 |
| Secant Modulus-CD (2%) | psi | 32,371 | 34,591 | 33,176 | 34,805 |
| Secant Modulus-MD (1%) | psi | 35,541 | 36,102 | 36,771 | 36,269 |
| Secant Modulus-MD (2%) | psi | 30,682 | 30,216 | 31,593 | 30,835 |

Test Methods

Test methods include the following:

Melt index

Melt indices ($I_2$ and $I_{10}$) were measured in accordance to ASTM D-1238 at 190° C. and at 2.16 kg and 10 kg load, respectively. Their values are reported in g/10 min.

Density

Samples for density measurement were prepared according to ASTM D4703. Measurements were made within one hour of sample pressing using ASTM D792, Method B.

Dynamic Shear Rheology

Samples were compression-molded into 3 mm thick×25 mm diameter circular plaques at 177° C. for 5 minutes under 10 MPa pressure in air. The sample was then taken out of the press and placed on the counter to cool.

Constant temperature frequency sweep measurements were performed on an ARES strain controlled rheometer (TA Instruments) equipped with 25 mm parallel plates, under a nitrogen purge. For each measurement, the rheometer was thermally equilibrated for at least 30 minutes prior to zeroing the gap. The sample was placed on the plate and allowed to melt for five minutes at 190° C. The plates were then closed to 2 mm, the sample trimmed, and then the test was started. The method has an additional five minute delay built in, to allow for temperature equilibrium. The experiments were performed at 190° C. over a frequency range of 0.1-100 rad/s at five points per decade interval. The strain amplitude was constant at 10%. The stress response was analyzed in terms of amplitude and phase, from which the storage modulus (G'), loss modulus (G"), complex modulus (G*), dynamic viscosity ($\eta$*), and tan ($\delta$) or tan delta were calculated.

Melt Strength

Melt strength measurements are conducted on a Gottfert Rheotens 71.97 (Goettfert Inc.; Rock Hill, S.C.) attached to a Gottfert Rheotester 2000 capillary rheometer. A polymer melt is extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die with an acceleration of 2.4 mm/second$^2$. The tensile force is recorded as a function of the take-up speed of the nip rolls. Melt strength is reported as the plateau force (cN) before the strand broke. The following conditions are used in the melt strength measurements: Plunger speed=0.265 mm/second; wheel acceleration=2.4 mm/s$^2$; capillary diameter=2.0 mm; capillary length=30 mm; and barrel diameter=12 mm.

Extensional Viscosity by EVF

Extensional viscosity is measured by an extensional viscosity fixture (EVF) of TA Instruments (New Castle, Del.) attached onto an ARES rheometer of TA Instruments at Hencky strain rates of 1.0 s$^{-1}$ at 150° C.

Sample Preparation for Extensional Viscosity Measurement

The sample plaque was prepared on a programmable Tetrahedron bench top press. The program held the melt at 177° C. for 5 minutes at a pressure of 10$^7$ Pa. The Teflon coated chase was then removed to the benchtop to cool. Test specimens were then die-cut from the plaque using a punch press and a handheld die with the dimensions of 10×18 mm$^2$ (Width×Length). The specimen's thickness is usually in the range of 0.7~0.9 mm.

Extensional Viscosity Measurement

The rheometer oven that encloses the EVF fixture is set to a test temperature of 150° C. for at least 60 minutes prior to zeroing fixtures. The width and the thickness of each film are measured at three different locations of the film and the average values are entered into the test program (TA Orchestrator version 7.2). Densities of the sample at room temperature (0.92 g/cm$^3$) and at the test temperature (0.782 g/cm$^3$) are also entered into the test program to allow for the program to calculate the actual dimensions of the film at the test temperature. The film specimen is attached onto each of the two drums of the fixture by a pin. The oven is then closed to let the temperature equilibrate before starting the test. The test is divided into three zones. The first zone is the pre-stretch zone that stretches the film at a very low strain rate of 0.005 s$^{-1}$ for 11 seconds. The purpose of this step is to reduce film buckling introduced when the film is loaded. This is followed by a relaxation zone of 60 seconds to minimize the stress introduced in the pre-stretch step. The third zone is the measurement zone where the film is stretched at the pre-set Hencky strain rate. The data collected in the third zone is used for analysis.

Strain Hardening Factor (SHF)

"Strain hardening factor" (or "SHF") is the ratio of the extensional viscosity to three times the shear viscosity measured at the same measurement time and at the same temperature. The "measurement time" is defined as the ratio of 3 to the applied Hencky strain rate in the extensional viscosity measurement. For example, the measurement time is 0.3 second for a strain rate of 10 s$^{-1}$, 3.0 second for a strain rate of 1 s$^{-1}$ and/or 30 seconds for a strain rate of 0.1 s$^{-1}$.

DSC Crystallinity Determination

Differential Scanning calorimetry (DSC) can be used to measure the crystallinity of a sample at a given temperature for a wide range of temperatures. For the Examples, a TA model Q1000 DSC (TA Instruments; New Castle, Del.) equipped with an RCS (Refrigerated Cooling System) cooling accessory and an autosampler module is used to perform the tests. During testing, a nitrogen purge gas flow of 50 ml/minute is used. Each sample is pressed into a thin film and melted in the press at about 175° C.; the melted sample is then air-cooled to room temperature (~25° C.). A 3-10 mg sample of the cooled material is cut into a 6 mm diameter disk, weighed, placed in a light aluminum pan (ca 50 mg), and crimped shut. The sample is then tested for its thermal behavior.

The thermal behavior of the sample is determined by changing the sample temperature upwards and downwards to create a response versus temperature profile. The sample is first rapidly heated to 180° C. and held at an isothermal state for 3 minutes in order to remove any previous thermal history. Next, the sample is then cooled to −40° C. at a 10° C./minute cooling rate and held at −40° C. for 3 minutes. The sample is then heated to 150° C. at 10° C./minute heating rate. The cooling and second heating curves are recorded. The values determined are peak melting temperature ($T_m$), peak crystallization temperature ($T_c$), the heat of fusion ($H_f$), and the % crystallinity for polyethylene samples calculated using Equation 1:

$$\% \text{ Crystallinity} = [(H_f(J/g))/(292 \, J/g)] \times 100 \quad \text{(Eq. 1)}$$

The heat of fusion ($H_f$) and the peak melting temperature are reported from the second heat curve. The peak crystallization temperature is determined from the cooling curve.

High Temperature Gel Permeation Chromatography

The Gel Permeation Chromatography (GPC) system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000, 000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using Equation 2 (as described in Williams and Ward, *J. Polym. Sci.*, Polym. Letters, 6, 621 (1968)):

$$M_{polyethylene} = A \times (M_{polystyrene})^B \quad \text{(Eq. 2)},$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

$^{13}$C NMR

The samples were prepared by adding approximately 2.7 g of a 50/50 mixture of tetrachloroethane-$d_2$/orthodichlorobenzene containing 0.025 M Cr(AcAc)3 to 0.4 g sample in a Norell 1001-7 10 mm NMR tube, and then purging in a N2 box for 2 hours. The samples were dissolved and homogenized by heating the tube and its contents to 150° C. using a heating block and heat gun. Each sample was visually inspected to ensure homogeneity. The data were collected using a Bruker 400 MHz spectrometer equipped with a Bruker Dual DUL high-temperature CryoProbe. The data were acquired at 57-80 hours per data file, a 7.3 sec pulse repetition delay (6 sec delay+1.3 sec acquisition time), 90 degree flip angles, and inverse gated decoupling with a sample temperature of 120° C. All measurements were made on non spinning samples in locked mode. Samples were homogenized immediately prior to insertion into the heated (125° C.) NMR Sample changer, and were allowed to thermally equilibrate in the probe for 7 minutes prior to data acquisition. The branch number was calculated from the integral of the peak region at 32.7 ppm and its relative ratio of the peak of neat LDPE.

Film Testing Conditions

The following physical properties are measured on the films produced:

Total and Internal Haze: Samples measured for internal haze and overall haze are sampled and prepared according to ASTM D 1746. Internal haze was obtained via refractive index matching using mineral oil on both sides of the films. A Hazegard Plus (BYK-Gardner USA; Columbia, MD) is used for testing.

45° Gloss: ASTM D-2457.

1% Secant Modulus-MD (machine direction) and CD (cross direction): ASTM D-882.

MD and CD Elmendorf Tear Strength: ASTM D-1922

MD and CD Tensile Strength: ASTM D-882

Dart Impact Strength: ASTM D-1709, Method A

Puncture Strength: Puncture strength is measured on a Instron Model 4201 with Sintech Testworks Software Version 3.10. The specimen size is 6"×6" and 4 measurements are made to determine an average puncture value. The film is conditioned for 40 hours after film production and at least 24 hours in an ASTM controlled laboratory. A 100 lb load cell is used with a round specimen holder 12.56" square. The puncture probe is a ½" diameter polished stainless steel ball with a 7.5" maximum travel length. There is no gauge length; the probe is as close as possible to, but not touching, the specimen. The crosshead speed used is 10"/minute. The thickness is measured in the middle of the specimen. The thickness of the film, the distance the crosshead traveled, and the peak load are used to determine the puncture by the software. The puncture probe is cleaned using a "Kimwipe" after each specimen.

Determination of Maximum Output Rate of Blown Film

Film samples are collected at a controlled rate and at a maximum rate. The controlled rate is 250 lb/hr which equals an output rate of 10 lb/hr/inch of die circumference. Note the die diameter used for the maximum output trials is an 8" die so that for the controlled rate, as an example, the conversion between lb/hr and lb/hr/inch of die circumference is shown in Equation 3. Similarly, such an equation can be used for other rates, such as the maximum rate, by substituting the maximum rate in Equation 3 for the standard rate of 250 lb/hr to determine the lb/hr/inch of die circumference.

$$\text{Lb/Hr/Inch of Die Circumference} = (250 \text{ Lb/Hr})/(8*\pi) = 10 \quad \text{(Eq. 3)}$$

The maximum rate for a given sample is determined by increasing the output rate to the point where bubble stability is the limiting factor. The extruder profile is maintained for both samples (standard rate and maximum rate), however the melt temperature is higher for the maximum rate samples due to the increased shear rate. The maximum rate is determined by maximizing both the internal bubble cooling and the external cooling via the air ring. The maximum bubble stability is determined by taking the bubble to the point where any one of the following things was observed (a) the bubble would not stay seated in the air ring (b) the bubble started to lose its shape (c) the bubble started to breathe in and out or (d) the frost line height would become unstable. At that point the rate is reduced to where the bubble is reseated in the air ring while maintaining the shape of the bubble and a steady frost line height and then a sample is collected. The cooling on the bubble is adjusted by adjusting the air ring and maintaining the bubble. This is taken as the maximum output rate while maintaining bubble stability.

Monolayer films were produced. The die diameter is 8 inches, the die gap is 70 mils, the blow up ratio is 2.5, and internal bubble cooling is used.

The present invention may be embodied in other forms without departing from the spirit and the essential attributes thereof, and, accordingly, reference should be made to the appended claims, rather than to the foregoing specification, as indicating the scope of the invention.

We claim:

1. A polyethylene blend-composition suitable for blown film comprising the melt blending product of:

from 0.5 to 4 percent by weight of a low density polyethylene having a density in the range of from 0.915 to 0.935 g/cm$^3$, and a melt index (I$_2$) in the range of from greater than 0.8 to less than or equal to 5 g/10 minutes, and a molecular weight distribution (M$_w$/M$_n$) in the range of from 6 to 10;

90 percent or greater by weight of a heterogeneous linear low density polyethylene having a density in the range of from 0.917 to 0.950 g/cm$^3$, and a melt index (I$_2$) in the range of from 0.1 to less than or equal to 5 g/10 minutes;

optionally a hydrotalcite based neutralizing agent;

optionally one or more nucleating agents; and optionally one or more antioxidants.

2. The polyethylene blend composition of claim 1, wherein when said polyethylene blend-composition is formed into a film via blown film process, the output rate is improved at least 6 percent relative to a similar linear low density polyethylene.

3. The polyethylene blend composition of claim 1, wherein the polyethylene blend composition has a peak at 32.7 ppm measured via $^{13}$C NMR, indicating the presence of C$_3$ carbon of C$_5$ branch in the low density polyethylene.

4. The polyethylene blend composition of claim 1, wherein when said polyethylene blend composition is formed into a film via blown film process, the total haze is improved by at least 15 percent relative to a blown film consisting essentially of a linear low density polyethylene.

5. The polyethylene blend composition of claim 1, wherein when said polyethylene blend composition is formed into a film via blown film process, the gloss is improved by at least 10 percent relative to a blown film consisting essentially of a linear low density polyethylene.

6. A blown film comprising the polyethylene blend-composition of claim 1.

7. An article comprising one or more blown films comprising the polyethylene blend-composition of claim 1.

8. A container device comprising:
(a) one or more substrates; and
(b) one or more layers comprising one or more blown films comprising the polyethylene blend-composition of claim 1.

* * * * *